United States Patent Office 3,809,685
Patented May 7, 1974

3,809,685
CROSS-LINKED ACRYLONITRILE POLYMER FIBERS
Hideo Sato and Yoshiharu Sugaya, Fujishi, Japan, assignors to Asahi Kasei Kogyo Kabushiki Kaisha
No Drawing. Filed Sept. 23, 1971, Ser. No. 183,219
Claims priority, application Japan, Sept. 26, 1970, 45/83,894
Int. Cl. C08f 15/38
U.S. Cl. 260—80.71       2 Claims

ABSTRACT OF THE DISCLOSURE

Cross-linked acrylonitrile polymer fibers having an excellent heat resistance can be obtained from a linear copolymer comprising acrylonitrile, a comonomer represented by the general formula of

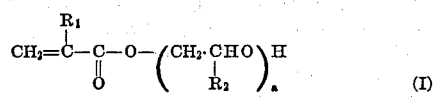  (I)

wherein $R_1$ is a hydrogen atom, a halogen atom or a specified organic group; $R_2$ is a hydrogen atom or a specified organic group, and $R_2$ in numbers of $a$ can be same or different; and $a$ is a positive integer of 1–100, and a comonomer represented by the general formula of

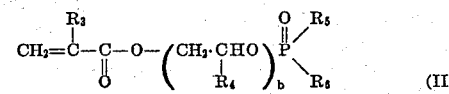  (II)

wherein $R_3$ has the same meaning as $R_1$; $R_4$ has the same meaning as $R_2$, except that $a$ is changed to $b$; $R_5$ and $R_6$ are hydrogen atoms, halogen atoms, specified organic groups, hydroxyl groups or basic salts thereof; and $b$ is a positive integer of 1–105, and as an optional comonomer, an ethylenically unsaturated compound copolymerizable with acrylonitrile.

A blend of said copolymer with polyacrylonitrile or other copolymers of acrylonitrile can be also used for preparing said fibers. Further, said copolymer can be used for producing cross-linked acrylonitrile composite fibers having an excellent heat resistance, as their one component.

---

This invention relates to cross-linked acrylonitrile polymer fibers having a good heat resistance and a process for producing the same. More particularly, it relates to cross-linked acrylonitrile polymer fibers having a good heat resistance which comprises a linear copolymer of acrylonitrile with both comonomers represented by the following General Formulae I and II, and further, if necessary, with an ethylenic unsaturated compound copolymerizable with acrylonitrile:

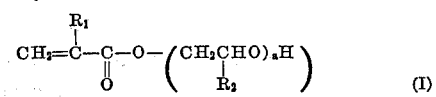  (I)

wherein $R_1$ is a hydrogen atom, a halogen atom or an organic radical defined hereinafter; $R_2$ is a hydrogen atom or an organic radical defined hereinafter, and $R_2$ in numbers of $a$ can be same or different; $a$ is a positive integer of 1–100, and

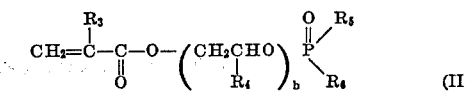  (II)

wherein $R_3$ has the same meaning as $R_1$; $R_4$ has the same meaning as $R_2$; $b$ is a positive integer of 1–105; $R_5$ and $R_6$ are hydrogen atoms, halogen atoms, organic radicals defined hereinafter, hydroxyl groups or basic salts thereof, and a process for producing the same.

Acrylonitrile polymer fibers had, at the initial development stage, such disadvantages that their dyeability was poor and fibrillation was liable to take place. Therefore, the studies on improvement of the acrylonitrile polymers have been heretofore directed mainly to elimination of these disadvantages, and various dyeable copolymers have been studied. Furthermore, the studies have been made also to reduce orientation of molecular chains of the fibers.

However, the acrylonitrile polymer fibers generally have a lower tenacity at breakage under a heated condition, especially in hot water than other synthetic fibers, and have a higher elongation at breakage. Said directions of studies to improve the disadvantages have much more deteriorated the mechanical properties of the acrylonitrile polymer fibers in hot water.

Recently, various attempts have been proposed to improve the heat resistance of the acrylonitrile polymer fibers by introducing cross-linking bonds between molecules of the acrylonitrile polymers. For example, there have been proposed a method based on the use of a monomer having at least two double bonds as one of the copolymer components and a method based on copolymerization of a monomer having an epoxy group and a monomer having a sulfonic acid group. However, when these copolymerization components capable of cross-linking are employed, cross-linked structures are formed during the step of polymerization or before the step for stretching the fibers, the stability of the dope for forming fibers is deteriorated, and the stretchability of fibers is considerably lowered. Further, a method for cross-linking the acrylonitrile polymer fibers by post-treating them with dicyandiamide and an aldehyde, considerably lowers the strength of the resulting fibers, particularly the knot strength. Furthermore, according to a method for cross-linking acrylonitrile polymer fibers containing hydroxyethyl methacrylate by treating the fibers with an aqueous phosphoric acid solution and curing the thus treated fibers, Young's modulus in hot water is not increased and the heat resistance in a true sense is not sufficient.

The present inventors have found that these disadvantages can be eliminated by making fibers from acrylonitrile polymers obtained by copolymerizing at least 0.5% by weight each of comonomers represented by general Formulae I and II with acrylonitrile, and then cross-linking the fibers. Since the copolymers of acrylonitrile with the comonomers represented by the general Formulae I and II form no gel during the step for preparing a spinning dope or the step for reserving the dope, the copolymers have excellent spinning properties. Furthermore, the present copolymers never undergo deterioration in the heat stretchability observed in the conventional methods for improving the heat resistance. The fact that the present copolymers have excellent spinning properties and heat stretchability as described above is very favorable for improving the mechanical properties of the fibers obtained from the present copolymers.

Any special heating operation is not necessary for obtaining fibers having cross-linked bonds of the present invention. That is, cross-linked bonds can be formed only by heating the fibers made from said copolymers in a simple manner, for example, in a drying step after stretching. As described above, since no special heating step is required in the present invention, coloring of fibers, deterioration of physical properties of the fibers, etc. can be prevented. Of course, it is also possible to make the cross-linking effect more remarkable by further curing the fibers dried in the manner as described above.

Substituent $R_1$ of the compounds represented by the General Formula I and substituent $R_3$ of the compounds represented by the General Formula II are selected from hydrogen atoms, halogen atoms and organic radicals. As the organic radicals, there are illustrated an alkyl having 1–18 carbon atoms; a methyl radical substituted with chlorine atom, hydroxy or cyano group; —CH$_2$COOR in which R is an alkyl having 1–18 carbon atoms; —COOR in which R is an alkyl having 1–18 carbon atoms; phenyl; and a phenyl substituted with an alkyl of 1–2 carbon atoms or halogen atom.

Preferable R$_1$ and R$_3$ are hydrogen atoms, chlorine atoms or the following organic radicals. The preferable organic radicals are groups —CH$_3$, —C$_6$H$_5$, —CH$_2$Cl, —COOC$_2$H$_5$, —COO·C·(CH$_3$)$_3$, —COOC$_2$H$_4$Cl,

—CH$_2$—COOCH$_3$, —CH$_2$—COOC$_2$H$_5$,

—CH$_2$—COOC$_2$H$_4$Cl and —CH$_2$—COO·C$_2$H$_4$CN. Particularly preferable R$_1$ and R$_3$ are hydrogen atom and —CH$_3$ radical.

Substituent R$_2$ of the compounds represented by the General Formula I and substituent R$_4$ of the compounds represented by the General Formula II are hydrogen atoms and the following organic radicals. As the organic radicals, there are illustrated an alkyl having 1–18 carbon atoms; a methyl radical substituted with alkoxy group having 1 to 18 carbon atoms; a methyl radical substituted with halogen atom, cyano group or sulfonic acid group; —CH$_2$COOR in which R is an alkyl having 1–18 carbon atoms; —COOR in which R is an alkyl having 1–18 carbon atoms; —COR in which R is an alkyl having 1–18 carbon atoms; phenyl; and a phenyl radical substituted with alkyl of 1–2 carbon atoms. Preferable R$_2$ and R$_4$ are hydrogen atom and radicals —CH$_3$, —C$_6$H$_5$, —CH$_2$—COOC$_2$H$_5$, —CH$_2$—O—C$_2$H$_5$, —CH$_2$—OH, —CH$_2$—CN, —CH$_2$Cl and —CH$_2$—SO$_3$Na. Particularly preferable R$_2$ and R$_4$ are hydrogen atom.

One of the preferable methods for preparing the compounds represented by the General Formula I is to react CH$_2$=CR$_1$—COOH with

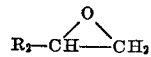

to thereby synthesize the compounds. In that case, predetermined amounts of at least two kinds of ethylene oxides having different groups as R$_2$ can be also subjected to reaction at the same time or successively. The 1-substituted ethylene oxide can be synthesized by oxidizing 1-substituted ethylene with a peroxide, for example, peracetic acid.

One of the preferable methods for synthesizing the compounds represented by the General Formula II is to prepare compounds similar to the compounds of the General Formula I according to the same preparation as that of the compounds of the above-mentioned General Formula I and as shown by the following reaction Formula A, and then to react the resulting compounds with

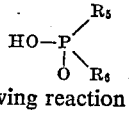

as shown by the following reaction Formula B to thereby obtain the desired Compounds II.

Reaction Formula A:

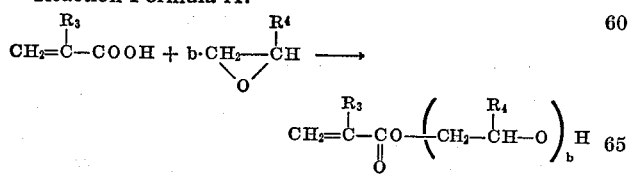

Reaction Formula B:

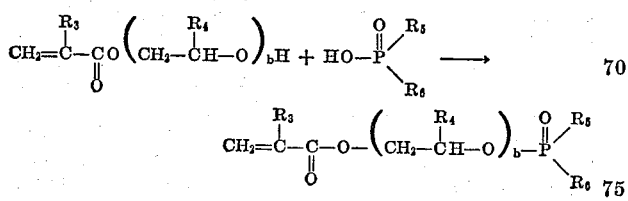

As the substituents R$_5$ and R$_6$, there are illustrated hydrogen; alkyl radical having 1–18 carbon atoms; —CH$_2$COOH; —CH$_2$COOR in which R is an alkyl having 1–18 carbon atoms; a methyl radical substituted with cyano group, hydroxyl group or halogen atom; halogen; phenyl; a phenyl substituted with halogen atom or alkyl having 1–2 carbon atoms; benzyloxy; benzyloxy substituted with halogen atom or alkyl having 1–2 carbon atoms; —OCH$_2$COOH; —OCH$_2$COOR in which R is an alkyl having 1 to 18 carbon atoms; —SCH$_2$COOH; —SCH$_2$COOR in which R is an alkyl having 1 to 18 carbon atoms; phenoxy substituted with alkoxy having 1–2 carbon atoms or halogen atom; and hydroxy group or its salt. Preferable R$_5$ and R$_6$ are hydroxyl groups and their sodium salts, potassium salts, ammonium salts and amine salts, tert.-butoxy groups, alkoxy groups of C$_8$–C$_{20}$, benzyloxy groups, phenoxy groups, monochloromethoxy groups, monochlorophenoxy groups, groups —CH$_2$—COOC$_2$H$_3$, groups —CH$_2$—COO—CH$_3$H$_7$, and groups —O—CH$_2$COOH. Most preferable R$_5$ and R$_6$ are hydroxyl groups or their salts, that is, sodium salts, potassium salts, ammonium salts, monoethylamine salts, dimethylamine salts, trimethylamine salts, monomethylamine salts, diethylamine salts, triethylamine salts, n-propylamine salts, n-butylamine salts, hydroxylamine salts, etc. When at least one of R$_5$ and R$_6$ is selected from the above most preferable groups, more excellent effect can be obtained.

Furthermore, $a$ and $b$ of the compounds represented by the General Formulae I and II used in the present invention can be integers of 1 or higher, that is, 1–100, preferably 1–20 in the case of $a$, while 1–105, preferably 1–20 in the case of $b$, and by properly selecting the integers, the elongation characteristic of the resulting fibers can be adjusted. For example, when it is desirable to reduce the elongation, $a$ and $b$ of lower integers must be employed. When the reduction in elongation is not required, $a$ and $b$ of higher integers must be employed. When $a$ and $b$ or higher integers are employed, a good hygroscopic property can be endowed to the fibers.

Preferable examples of the compounds represented by the General Formula (I) used in the present invention include those having the following structural formulae:

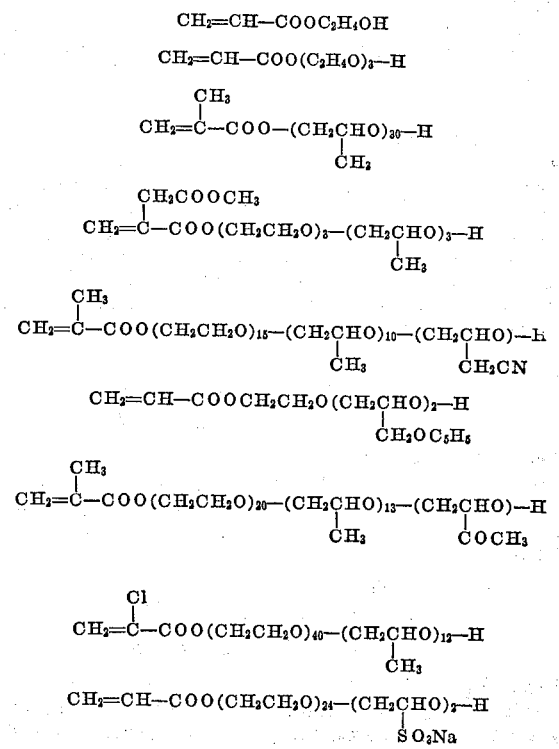

$$CH_2=C(COOC_2H_4Cl)-COO-(CH_2CH_2O)_{70}-H$$
$$|CH_3$$
$$CH_2=C-COOC_2H_4OCH_2CHOH$$
$$|C_6H_5$$
$$CH_2=C(CH_2COOC_2H_4CN)-COO(C_2H_4O)_{10}-H$$
$$CH_2=C(CH_2Cl)-COO(C_2H_4O)_{20}-(CH_2CHO)_{15}-H$$
$$|CH_3$$
$$CH_2=C(C_6H_5)-COO-(CH_2CHO)_2-H$$
$$|CH_3$$
$$CH_2=C(CH_3)-COOCH_2CH-OH$$
$$|CH_2Cl$$
$$CH_2=C(CH_3)-COO-(CH_2CHO)_3-N$$
$$|CH_2CN$$

Preferable examples of the compounds represented by the General Formula II include those having the following structural formulae:

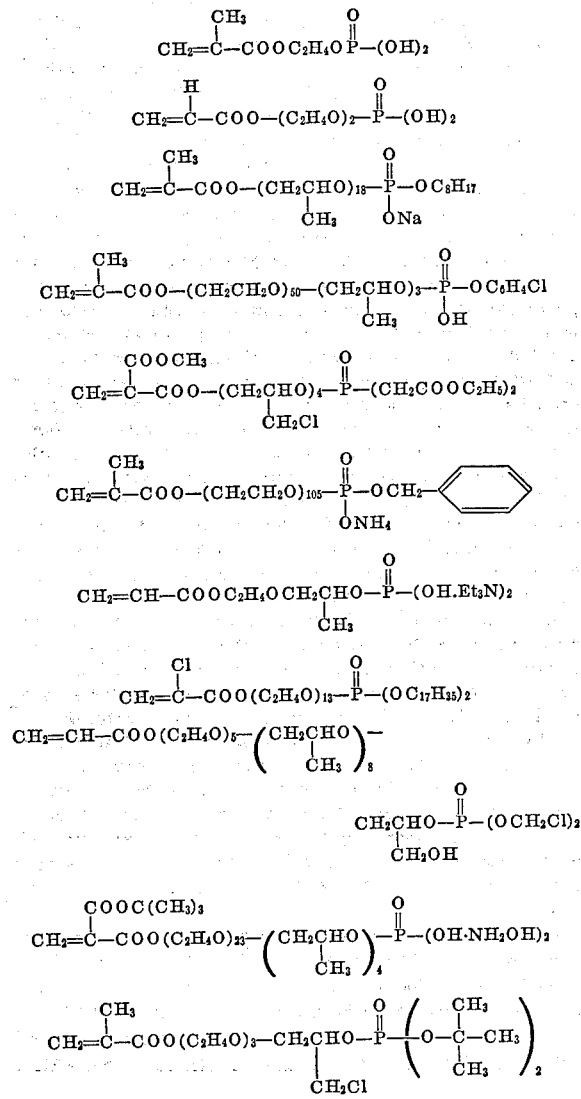

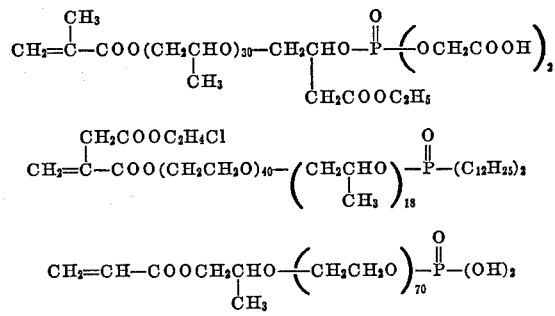

Copolymers of acrylonitrile with the compounds represented by the General Formula I and the compounds represented by the General Formula II of the present invention can be prepared by bulk polymerization, solution polymerization, suspension polymerization, emulsion polymerization or precipitation polymerization. In carrying out the polymerizations other than the bulk polymerization, there can be illustrated the following solvents which are used singly or in a mixture: dimethylformamide, dimethylacetamide, dimethylsulfoxide, ethylene carbonate, a concentrated aqueous solution of thiocyanate, a concentrated aqueous solution of zinc chloride, a concentrated aqueous solution of nitric acid, etc. which can dissolve the copolymer, and water, benzene, toluene petroleum ether, dichloroethane, carbon tetrachloride, chloroform, methyl alcohol, ethyl alcohol, isopropyl alcohol, tetrahydrofuran, dioxane, ethyl acetate, acetone, acetonitrile, etc.

In carrying out the suspension polymerization, the well-known dispersing agents can be used. As emulsifying agents for the emulsion polymerization, the ordinary emulsifiers, for example, anionic, cationic, or neutral emulsifiers, such as polyalkylene oxides, alkali salts of long chain alkyl sulfonic acid, quaternary ammonium salts having hydrophobic radicals, are used.

The polymerization of the present invention proceeds merely by heating, but can be carried out by using a free radical-generating initiator. As the free radical-generating initiator, inorganic initiators, for example, hydrogen peroxide, persulfates, perphosphates, or a redox initiator comprising such combinations as hydrogen peroxide and iron ions, persulfates and reducible sulfoxy compounds, chlorates and reducible sulfoxy compounds, or the like, or organic initiator, for example, benzoyl peroxide, tert.-butyl hydroperoxide, lauryl peroxide, acetyl peroxide, azobisisobutyronitrile, azobisdimethylvaleronitrile, etc. can be illustrated. The amount of the initiator to be used depends upon a composition of monomers, polymerization method, polymerization temperature, polymerization time, kind of initiator, etc., but is usually 0.01 to 10% by weight, based on the total weight of the monomers. Other sources of free radical for initiating the polymerization, for example, electron impulse, ultra-violet rays in the presence of a sensitizer, etc. can be also used.

The polymerization can be carried out continuously, semi-continuously or batch-wise. Since the compounds represented by the General Formulae I and II of the present invention have high copolymerizability with acrylonitrile, it is not necessary to make a polymerization temperature especially higher. Though the polymerization temperature depends upon the polymerization method or the kind of initiators, it is in a range of 0° to 70° C.

The resulting copolymer is purified, if necessary, according to the ordinary method. That is to say, in the case of bulk polymerization, the copolymer is purified as such according to a solvent extraction method, or is once dissolved in a suitable solvent, reprecipitated and then filtered. In the case of solution polymerization, where polymerization is carried out in a solvent capable of dissolving the copolymer, it is also possible to use the resulting copolymers as it is, or the resulting polymer is purified in the same manner as above, after the removal of the solvent, or precipitated with a poor solvent to thereby withdraw the copolymer. In the case of suspension polymerization, the resulting copolymer can be sufficiently purified with a suitable solvent, if necessary, after the filtration. In the case of emulsion polymerization, the resulting copolymer is precipitated by adding a suitable salting-out agent, such as alum, to the emulsion and filtered and then can be sufficiently purified with a suitable solvent.

In carrying out the copolymerization of acrylonitrile with the compounds represented by the General Formulae I and II of the present invention, 0.1 to 10% by weight of at least one of the following ethylenic unsaturated compounds can be added to the system, if necessary, as a component for the copolymerization to thereby much improve the dyeability, spinnability and stretchability of the resulting fibers.

As the ethylenic unsaturated compounds, there are illustrated such acrylic esters as methyl acrylate, ethyl acrylate, propyl acrylate, butyl acrylate, octyl acrylate, etc.; such methacrylic acid esters as methyl methacrylate, ethyl methacrylate, propyl methacrylate, butyl methacrylate, stearyl methacrylate; such itaconic acid esters as dimethyl itaconate and diethyl itaconate; such carboxylic acid compounds as unsaturated monobasic, dibasic, or more basic carboxylic acids, for example, acrylic acid, methacrylic acid, itaconic acid, maleic acid, etc.; such amides or mono- or di-substituted amides of unsaturated fatty acids as acrylic amide, acrylic monomethylamide, acrylic dimethylamide, acrylic monoethylamide, acrylic diethylamide, methacrylic tert.-butylamide, acrylic methylolamide; such $\alpha$ - substituted acrylonitriles as $\alpha$ - chloroacrylonitrile, $\alpha$-methylacrylonitrile, $\alpha$-propylacrylonitrile, $\alpha$-butylacrylonitrile, $\alpha$-cyanoacrylonitrile, $\alpha$-phenylacrylonitrile; and others such as vinyl chloride, vinylidene chloride, styrene, vinyl acetate, methallylsulfonic acid and its salts, vinylsulfonic acid and its salts, vinylstyrenesulfonic acid and its salts, sulfopropyl methacrylate and its salts, vinylpyridines, vinylpyrrolidone, etc.

The degree of polymerization of the acrylonitrile copolymers of the present invention can be widely changed according to the polymerization method, initiator, etc., but in view of easiness in application, copolymers having an intrinsic viscosity in a range of 0.3 to 4.0 as measured, by using an Ostwald viscosimeter at 35.0° C., in a dimethylformamide solution at a concentration of 0.3 g./100 ml., are preferable.

The acrylonitrile copolymers of the present invention are used in the following manner according to a sum total of the contents of the compounds as represented by the General Formulae I and II. For example, when 1 to 25% by weight, preferably 5 to 20% by weight of sum total of both compounds as represented by the General Formulae I and II are contained and 70% or more by weight of acrylonitrile is contained, based on the weight of total constituent monomers, the copolymers can be spun in the same manner as in the case of the ordinary acrylonitrile synthetic fibers, and acrylonitrile polymer fibers having a good heat resistance and intermolecular cross-linkings can be thereby obtained. When less than 0.5% by weight each of the compounds as represented by the General Formulae I and II is contained, the effectiveness of the present invention cannot be attained sufficiently. On the other hand, when more than 25% by weight of sum total of the compounds as represented by the General Formulae I and II is contained, the resulting fibers have poor physical properties, when wetted.

Said disadvantages as observed when the sum total of both compounds as represented by the General Formulae I and II is in a higher percentage, can be improved by mixing the present copolymer with polyacrylonitriles or the heretofore well known acrylonitrile copolymers and making fibers from the resulting mixture.

Particularly when a cross-linking effeciency is to be enhanced, such a method is effective. That is, the desired object can be readily attained by using small amounts of the compounds as represented by the General Formulae I and II. When the mixing of the present copolymers with polyacrylonitrile or other acrylonitrile copolymers is to be carried out, it is more advantageous, in view of the improvement of the above-mentioned disadvantages, to use the present copolymers containing a larger amount of both compounds as represented by the General Formulae I and II to reduce the mixing ratio. That is to say, there can be used copolymers containing at least 5% by weight each and up to 50% by weight, preferably up to 45% by weight of the sum total, of both compounds as represented by the General Formulae I and II. The content of the sum total of both compounds as represented by the General Formulae I and II, in the mixture of the present copolymers and polyacrylonitrile or other arcylonitrile copolymers, is 1–25% by weight based upon the weight of the mixture. However, it is not preferable to use the present copolymer containing more than 60% by weight of sum total of both compounds as represented by the General Formulae I and II, because the yield at the time of polymerization is lowered or the resulting copolymer becomes so hydrophilic that it is readily dissolved at the time of spinning.

The mixing of the present copolymers with polyacrylonitrile or the heretofore well known acrylonitrile copolymers for making fibers from the resulting mixture can be carried out according to any of the following methods. That is to say, there are available a method for mixing a solution of the present copolymers with a solution of polyacrylonitrile or acrylonitrile copolymers; a method for mixing a slurry of the present copolymers with a slurry of polyacrylonitrile or acrylonitrile copolymers; a method for mixing an emulsion of the present copolymers with an emulsion of polyacrylonitrile or acrylonitrile copolymers; a method for mixing the present copolymers with polyacrylonitrile or acrylonitrile copolymers; a method for dissolving separately the present copolymers and polyacrylonitrile or acrylonitrile copolymers in the well known solvents for the acrylonitrile copolymers and then mixing the separate solutions in a mixer or in a pipe line or just before a spinneret as in the case of spinning of composite fibers; a method for mixing the present copolymers with polyacrylonitrile or acrylonitrile copolymers, dissolving separately the resulting mixture and polyacrylonitrile or acrylonitrile copolymers in the well known solvents for the acrylonitrile copolymers, and then mixing the resulting separate solutions in a mixer, or in a pipe line or just before a spinneret as in the case of spinning composite fibers; a method for mixing the present copolymers with polyacrylonitrile or acrylonitrile copolymers, dissolving separately the resulting mixture and the present copolymers in the well known solvents for the acrylonitrile copolymers, and then mixing the resulting individual solutions in a mixer, or in a pipe line or just before a spinneret as in the case of spinning composite fibers.

In preparing fibers from the present acrylonitrile copolymers alone or a mixture of copolymers as described above, the copolymers or the mixtures thereof are dissolved in the heretofore well known solvent for the acrylonitrile copolymer, for example, dimethylformamide, dimethylacetamide, dimethylsulfoxide, a concentrated aqueous solution of thiocyanate, a concentrated aqueous solution of zinc chloride, a concentrated aqueous solution of zinc chloride, a concentrated aqueous solution of nitric acid, etc., spun according to the conventional wet method, post-treated and dried by heating. The resulting fibers have a good resistance to hot water and intermolecular cross-linkings.

Further, the thus obtained fibers containing the present copolymers are dried at 80° to 170° C. to thereby from cross-linkings. The fibers are further heated in the dry state at a temperature higher than above-mentioned drying temperature to obtain fibers having much improved intermolecular cross-linkings and resistance to hot water.

When the temperature is below 80° C., the cross-linking formation reaction cannot be advanced sufficiently, whereas when the temperature is above 170° C., the fibers are changed to yellow.

Now, the present invention will be explained in detail, referring to examples. In examples, parts and percentage are by weight. Reduced viscosity is determined at 35.0° C. in a dimethylformamide solvent at a copolymer concentration of 0.3 g./100 ml.

Resistances to hot water are judged from the values of Young's modulus, tenacities and elongations at breakage as determined from the incipient gradient of stress-strain curves plotted for the samples placed in hot water at 95° C. by using Tensilon Type UTM-II made by Toyo Sokki Co. Ltd., Japan. Percentage moisture regains are determined from the following formula by drying a sample in a hot air at 80° C. for 24 hours after scouring, placing the sample in a desiccator kept at 20° C. and 65% RH and allowing it to stand for 24 hours to measure a weight increment. The percentage moisture regain is represented per weight of fibers.

Percentage moisture regain $$= \frac{(\text{Weight of wet fibers}) - (\text{Weight of dry fibers})}{(\text{Weight of dry fibers})} \times 100 \ (\%)$$

The cross-linking degrees are determined by measuring percentage gelation for each fiber which is defined by the following formula:

Percentage gelation $$= \frac{\text{weight of fibers as residues of extractions with dimethylformamide (DMF)}}{\text{weight of untreated fibers}} \times 100 \ (\%)$$

Extractions with DMF are carried out at 60° C. for one hour.

EXAMPLE 1

A 15 l. capacity flask provided with a stirrer was used as a polymerization reactor. Monomers, water and a polymerization initiator were introduced from one opening of the vessel, while allowing the corresponding amount to flow out of another opening of the vessel. Polymerization was carried out by continuously conducting the above-mentioned procedure to prepare a copolymer of the present invention.

The details of the preparing conditions were as follows:
Composition of monomers:

| | Parts |
|---|---|
| Acrylonitrile | 83 |
| $CH_2=\overset{CH_3}{\underset{|}{C}}-COO-(CH_2CHO)_{80}-H$ with $CH_3$ side | 15 |
| $CH_2=\overset{H}{\underset{|}{C}}-COO(CH_2CH_2O)_2\overset{O}{\underset{|}{\overset{\|}{P}}}-OH$ with $OH$ | 2 |

Ratio of the total monomers to water: 1:7
Initiator: Ammonium persulfate 0.5% (based upon the total monomers)
pH: 2.5 (adjusted with sulfuric acid)
Temperature: 60° C.
Average staying time: 5 hours After elapse of 25 hours from the starting of the feed, a portion of flowing-out slurry was taken out, filtered, washed with water and dried to determine the weight of the resulting copolymer. It was found that the total yield (the percentage by weight of the overflown copolymer based upon the weight of the monomers introduced per unit time) was 80%. The contents of nitrogen and phosphorus in the resultant copolymer were measured to calculate the composition of the copolymer.

The composition was as follows:

| | Percent |
|---|---|
| Acrylonitrile | 83.7 |
| $CH_2=\overset{CH_3}{\underset{|}{C}}-COO-(CH_2CHO)_{80}-H$ (CH$_3$) | 14.5 |
| $CH_2=\overset{H}{\underset{|}{C}}-COO(CH_2CH_2O)_2\overset{O}{\overset{\|}{P}}-OH$ (OH) | 1.8 |

Also, the reduced viscosity as measured by the use of dimethylformamide was 0.97.

EXAMPLE 2

Into a 5 l. capacity polymerization reactor provided with a stirrer were introduced following materials:

| | Parts |
|---|---|
| Acrylonitrile | 89 |
| $CH_2=\overset{H}{\underset{|}{C}}-COO(CH_2CH_2O)_3H$ | 1 |
| $CH_2=\overset{CH_3}{\underset{|}{C}}-COO-(CH_2-CHO)_{18}-\overset{O}{\overset{\|}{P}}-OC_8H_{17}$ (CH$_3$, ONa) | 10 |
| Ammonium hydroxylaminesulfonate | 1 |
| Ammonium hydrogen sulfite | 4 |
| Sodium dodecylbenzenesulfonate | 2 |
| Ion-exchange water | 1000 |

The pH of the feed was adjusted to 3.0 with nitric acid, and a polymerization reaction was carried out at 50° C. for 8 hours.

Alum was added to the emulsion thus obtained to salt out the resulting copolymer, which was filtered, washed with water and dried. The polymerization yield was 74%.

The composition of the copolymer thus obtained was as follows:

| | Percent |
|---|---|
| Acrylonitrile | 89.7 |
| $CH_2=\overset{H}{\underset{|}{C}}-COO(CH_2CH_2O)_3H$ | 1.2 |
| $CH_2=\overset{CH_3}{\underset{|}{C}}-COO-(CH_2CHO)_{18}-\overset{O}{\overset{\|}{P}}-OC_8H_{17}$ (CH$_3$, ONa) | 9.1 |

The reduced viscosity was 1.57.

EXAMPLE 3

| | Parts |
|---|---|
| Acrylonitrile | 24.13 |
| $CH_2=\overset{CH_2COOCH_3}{\underset{|}{C}}-COO-(CH_2CH_2O)_3-(CH_2CHO)_3-H$ (CH$_3$) | 0.5 |
| $CH_2=\overset{CH_3}{\underset{|}{C}}-COO-(CH_2CH_2O)_{50}-(CH_2CHO)_3-\overset{O}{\overset{\|}{P}}-OC_6H_4Cl$ (CH$_3$, OH) | 0.25 |
| Sodium styrenesulfonate | 0.12 |
| and | |
| Azobisisobutyronitrile | 0.05 | were dissolved in 75 parts of dimethylsulfoxide and one part of water. The resulting solution was passed successively through three polymerization reactors of 20 l.-capacity maintained at 60° C., at a flow rate of 5 l./hr. The polymerization yield was 77%, and there was almost not catalyst remaining. The solution was continuously evaporated by means of a vertical, thin-film type evaporator of Luwa to remove unreacted monomers. The polymer concentration of the liquid taken out was 20.2%. The viscosity of the liquid was 190 poises.

The composition of the copolymer thus obtained was as follows:

| | Percent |
|---|---|
| Acrylonitrile | 96.4 |

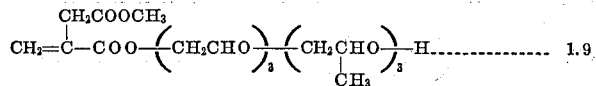
1.9

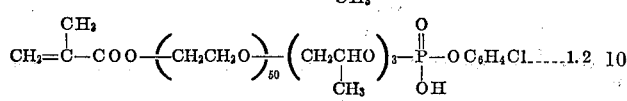
1.2

Sodium styrenesulfonate ..... 0.5

The reduced viscosity was 2.01.

EXAMPLE 4

| | Parts |
|---|---|
| Acrylonitrile | 60 |

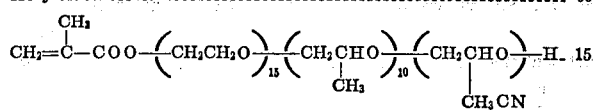
15

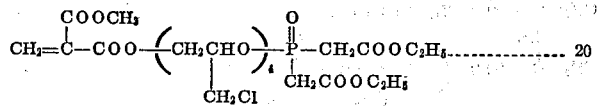
20 and
Methyl methacrylate ..... 5 were dissolved in 900 parts of purified toluene. After purging by nitrogen gas, the resulting solution was made 40° C. 1.2 part of benzoyl peroxide was added thereto with stirring, and polymerization was carried out for 6 hours. After removal of toluene under reduced pressure, the resulting residue was dissolved in dimethylacetamide. The resulting solution was added to an excessive amount of methyl alcohol to precipitate a copolymer, followed by filtration, sufficient washing with methyl alcohol and drying. The polymerization yield was 71.3%.

The composition of the copolymer thus obtained was as follows:

| | Percent |
|---|---|
| Acrylonitrile | 59.9 |

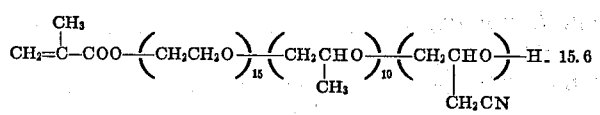
15.6

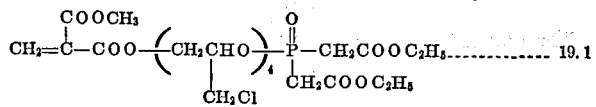
19.1

Methyl methacrylate ..... 5.4

The reduced viscosity was 3.27.

EXAMPLE 5

According to the method of Example 2, a copolymer of the present invention was prepared.

The results are shown in Table 1, wherein the structures of the compounds used in the present example are expressed by $R_1$, $R_3$, $R_5$, $R_6$, $R_9$, $R_{10}$, $l$, $m$, $n$, $p$, $q$ and $s$ as seen in the following General Formulae III and IV. AN means acrylonitrile.

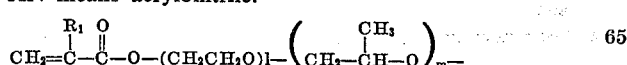

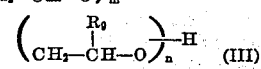
(III)

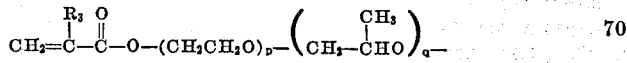

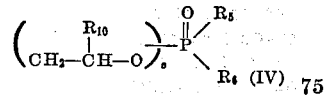
(IV)

TABLE 1

| Copolymer number | Compound of General Formula III | | | | | | | | Compound of General Formula IV | | | | | | |
|---|---|---|---|---|---|---|---|---|---|---|---|---|---|---|---|
| | $R_1$ | $R_3$ | $R_9$ | $l$ | $m$ | $n$ | $R_3$ | Content | $R_{10}$ | $R_5$ | $R_6$ | $p$ | $q$ | $s$ | Content |
| 5-1 | —H | —CH$_2$OC$_2$H$_5$ | —COCH$_3$ | 1 | 0 | 2 | —CH$_3$ | 1.2 | —H | —OCH$_3$ | —ONH$_4$ | 0 | 82 | 23 | 0.7 |
| 5-2 | —CH$_3$ | —COCH$_3$ | | 20 | 13 | 1 | —H | 3.4 | | —C$_3$H$_7$ | —OEt$_3$NH | 1 | 1 | 0 | 6.1 |
| 5-3 | —H | —COOC$_2$H$_5$ | | 100 | 0 | 0 | —Cl | 7.7 | —CH$_2$OH | —OC$_{17}$H$_{35}$ | —OC$_{17}$H$_{35}$ | 13 | 0 | 0 | 5.0 |
| 5-4 | —H | —Cl | | 8 | 0 | 0 | —H | 13.1 | —H | —OCH$_2$Cl | —OCH$_2$Cl | 5 | 8 | 1 | 1.9 |
| 5-5 | —Cl | —COOC$_2$H$_4$Cl | —CH$_2$SO$_3$Na | 40 | 12 | 0 | —COOC(CH$_3$)$_3$ | 8.6 | —CH$_2$Cl | —OH, —NH$_2$OH | —OH, —NH$_2$OH | 19 | 4 | 4 | 9.3 |
| 5-6 | —COOC$_2$H$_5$ | —CH$_3$ | | 24 | 0 | 2 | —CH$_3$ | 7.9 | —CH$_2$COOH | —OC(CH$_3$)$_3$ | —OC(CH$_3$)$_3$ | 3 | 0 | 1 | 14.5 |
| 5-7 | —CH$_3$ | —COOC$_2$H$_4$Cl | | 70 | 0 | 0 | —CH$_2$COOC$_2$H$_4$Cl | 33.5 | | —OCH$_2$COOH | —OCH$_2$COOH | 0 | 30 | 1 | 8.1 |
| 5-8 | —COOC$_3$H$_4$CN | —CH$_2$COOC$_2$H$_4$CN | —C$_6$H$_5$ | 5 | 0 | 1 | —CH$_2$COOC$_2$H$_4$Cl | 23.6 | | —C$_{12}$H$_{25}$ | —C$_{12}$H$_{25}$ | 40 | 18 | 1 | 11.5 |
| 5-9 | —CH$_3$ | —H | | 1 | 0 | 0 | —H | 6.1 | —H | —OH | —OH | 0 | 0 | 70 | 40.3 |
| 5-10 | —H | —CH$_3$ | | 10 | 3 | 0 | —CH$_3$ | 10.2 | | —OH | —OH | 1 | 1 | 0 | 1.3 |
| 5-11 | —H | —H | | 0 | 0 | 0 | —H | 6.4 | | —OH | —OH | 4 | 0 | 0 | 8.3 |
| 5-12 | —CH$_3$ | —CH$_3$ | | 2 | 5 | 0 | —H | 7.4 | | —OCH$_3$ | —OH | 3 | 3 | 0 | 12.0 |

TABLE 1—Continued

| Copolymer No. | Composition of copolymer (percent) | | | Polymerization yield (percent) | Reduced viscosity |
| --- | --- | --- | --- | --- | --- |
| | AN | Other component | Other component | | |
| 5-1 | 90.4 | Ethyl acrylate, 7.0 | Sodium methallylsulfonate, 0.7 | 82.5 | 1.88 |
| 5-2 | 87.7 | Acrylic amide, 2.1 | Sodium styrenesulfonate, 0.7 | 80.1 | 1.37 |
| 5-3 | 83.4 | Vinyl acetate, 3.9 | | 76.0 | 1.11 |
| 5-4 | 85.0 | | | 78.3 | 2.31 |
| 5-5 | 76.8 | α-Methylacrylonitrile, 5.3 | | 74.5 | 1.21 |
| 5-6 | 68.6 | Vinylidene chloride, 10.0 | | 73.4 | 0.85 |
| 5-7 | 58.4 | | | 70.0 | 1.24 |
| 5-8 | 64.9 | | | 72.1 | 1.57 |
| 5-9 | 53.6 | | | 66.4 | 1.53 |
| 5-10 | 88.0 | | Sodium methallylsulfonate | 81.1 | 1.64 |
| 5-11 | 84.9 | | | 78.4 | 1.60 |
| 5-12 | 80.1 | | Sodium methallylsulfonate, 0.5 | 76.1 | 1.38 |

EXAMPLE 6

The copolymer of the present invention obtained in Example 1 was dissolved in 55% aqueous solution of sodium rhodanate at 25° C. so as to give a concentration of polymer solution of 15%. The resulting solution was maintained at this concentration for 8 hours to prepare a spinning solution. The solution thus obtained was extruded into 10% aqueous solution of sodium rhodanate at 10° C., and coagulated. The resultant filaments were washed with water and then heat-stretched by 7 times in boiling water.

The resulting filaments were dried in hot air at 80° C. for one hour to subject the filaments to cross-linking, followed by wet heat treatment at 100° C.

The moisture regain, Young's modulus as measured in hot water at 95° C., and tenacity and elongation at breakage, of the filaments thus obtained, are shown in Table 2. Further, the filaments were treated by dry heat at 120° C. for 20 minutes to subject them to additional cross-linking. The moisture regain, Young's modulus as measured in hot water at 95° C., and tenacity and elongation at breakage, of the resulting filaments are also shown in Table 2.

As controls, copolymers having following compositions were prepared under the same conditions as in Example 1, and spun as mentioned above to prepare filaments. Further, the filaments were subjected to a dry heat treatment under the same conditions as mentioned above.

Control 1:

Percent

Acrylonitrile ......................................................... 83.8

$$CH_2=\overset{CH_3}{\underset{|}{C}}-COO-(CH_2\underset{|}{\overset{|}{C}HO})_{86}-H \quad \text{..........} \quad 16.2$$
$$\phantom{CH_2=C-COO-(CH_2}CH_3$$

Control 2:

Acrylonitrile ......................................................... 85.9

$$CH_2=\overset{H}{\underset{|}{C}}-COO-(CH_2CH_2O)_2-\overset{O}{\underset{|}{\overset{\|}{P}}}-OH \quad \text{..........} \quad 14.1$$
$$\phantom{CH_2=C-COO-(CH_2CH_2O)_2-}OH$$

Control 3:

Acrylonitrile ......................................................... 85.0

$$CH_2=\overset{CH_3}{\underset{|}{C}}-COO-(CH_2CH_2O)_{18}-CH_3 \quad \text{..........} \quad 15.0$$

Control 4:

Acrylonitrile ......................................................... 91.3

$$CH_2=\overset{CH_3}{\underset{|}{C}}-COO-(CH_2-\underset{\underset{CH_3}{|}}{\overset{|}{C}HO})_{80}-H \quad \text{..........} \quad 0.4$$

$$CH_2=CH-COO-(CH_2CH_2O)_2-\overset{O}{\underset{|}{\overset{\|}{P}}}-OH \quad \text{..........} \quad 0.3$$
$$\phantom{CH_2=CH-COO-(CH_2CH_2O)_2-}OH$$

Butyl acrylate ......................................................... 8.0

The respective moisture regain, Young's modulus as measured in hot water at 95° C., and tenacity and elongation at breakage, of the above-mentioned untreated filaments, dry-heat-treated filaments and an acrylonitrile polymer fiber on sale (a product of a company A) (Control 5) are also shown in Table 2.

TABLE 2

| | Untreated | | | | | 120° C.×20 minutes treatment | | | | | |
| --- | --- | --- | --- | --- | --- | --- | --- | --- | --- | --- | --- |
| | Moisture regain (percent) | Young's modulus (g./d.) | Cross-linking, degrees | Tenacity (g./d.) | Elongation (percent) | Moisture regain (percent) | Young's modulus (g./d.) | Cross-linking, degrees | Tenacity (g./d.) | Elongation (percent) | Note |
| The present invention | 5.7 | 3.2 | 71 | 1.76 | 48 | 5.7 | 3.4 | 94 | 1.81 | 43 | |
| Control: | | | | | | | | | | | |
| 1 | 3.3 | 0.6 | 0 | 0.73 | 115 | 3.3 | 0.6 | 0 | 0.73 | 110 | |
| 2 | 3.0 | 0.8 | 5 | 0.92 | 108 | 3.0 | 0.9 | 9 | 0.98 | 101 | |
| 3 | 3.2 | 0.5 | 0 | 0.64 | 132 | 3.2 | 0.5 | 0 | 0.64 | 132 | |
| 4 | 3.1 | 0.8 | 7 | 0.83 | 105 | 3.1 | 0.7 | 12 | 0.83 | 98 | |
| 5 | | | | | | 1.3 | 0.7 | 0 | 0.81 | 120 | Acrylonitrile polymer fiber on sale (product of company A). |

EXAMPLE 7

The copolymer of the present invention obtained in Example 2 was dissolved in 80% nitric acid at 0° C. to prepare a spinning solution, which was extruded into 30% aqueous solution of nitric acid. The resulting filaments were then washed with water, stretched by 7 times in boiling water, dried in a hot air at 140° C., for 30 minutes to subject them to cross-linking, followed by a wet heat treatment in a saturated steam at 110° C. to prepare filaments of about 3 deniers.

The Young's modulus as measured in hot water at 95° C., and tenacity and elongation, at break of the resulting filament, are shown in Table 3.

As a control (Control 6), a copolymer consisting of 86.3% of acrylonitrile and 13.7% of acrylic acid, was prepared under the same conditions as in Example 2, and then spun as mentioned above, followed by drying. The resulting filaments showed so remarkable adhesion between each other, that separation to individual filaments was utterly impossible.

Further as a control (Control 7), a copolymer consisting of 71.8% of acrylonitrile, 16.3% of

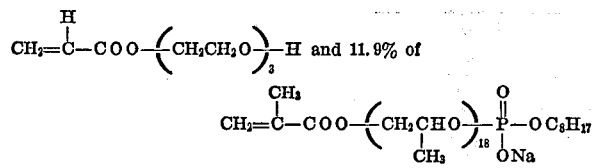

was prepared under the same conditions as in Example 2, and then spun as mentioned above.

The Young's modulus as measured in a hot water at 95° C., and tenacity and elongation at breakage, of the resulting filaments, are also shown in Table 3.

TABLE 3

|  | Young's modulus (g./d.) | Tenacity (g./d.) | Elongation (percent) |
|---|---|---|---|
| The present invention | 3.3 | 1.78 | 51 |
| Control 7 | 1.1 | 1.71 | 49 |

EXAMPLE 8

The spinning solution obtained in Example 3 was extruded into a coagulation bath of an aqueous solution of dimethylsulfoxide at 55° C., having a concentration of 50%, and coagulated. The resulting filaments were washed with water, stretched to 7 times in a hot water at 98° C., and dried in hot air at 160° C. for 20 minutes to subject them to cross-linking. The filaments were then subjected to a wet heat treatment in a saturated steam at 110° C. to prepare filaments of about 3 deniers.

Further, the resulting filaments were treated by dry heat at 160° C. for 2 minutes to subject them to additional cross-linking.

The respective Young's modulus as measured in hot water at 95° C., and tenacity and elongation at breakage, of the filaments thus obtained, are shown in Table 4.

composition consisting of 90% of acrylonitrile and 10% of methyl acrylate, was dissolved in 80% nitric acid, and then spun in the same manner as in Example 7. The resulting filaments were washed with water, stretched, dried at 100° C. for 50 minutes to effect cross-linking, and subjected to wet heat treatment at 110° C. Further, the filaments thus obtained were treated by dry heat at 140° C. for 5 minutes to effect additional cross-linking.

The respective Young's modulus as measured in a hot water at 95° C. and elongation at breakage, of these filaments are shown in Table 5.

TABLE 5

|  | Untreated | | | 140° C.×5 min. treatment | | |
|---|---|---|---|---|---|---|
|  | Young's modulus (g./d.) | Tenacity (g./d.) | Elongation (percent) | Young's modulus (g./d.) | Tenacity (g./d.) | Elongation (percent) |
| The present invention | 3.3 | 1.68 | 53 | 3.4 | 1.76 | 47 |

EXAMPLE 10

The copolymer of the present invention obtained in Examples 5–9, and a copolymer having a composition consisting of 96.5% of acrylonitrile, 3% of vinyl acetate and 0.5% of sodium styrenesulfonate, were separately dissolved in a purified 70% nitric acid at −10° C. so as to each have a copolymer concentration of 18%, and then extruded from a spinning die for composite fiber having 1200 holes, into 28% nitric acid at −10° C. so as to make the ratio of the two components 1:1. The resulting composite filaments were sufficiently washed with water, stretched by 8 times in hot water at 96° C., treated with a well-known oiling agent, and dried at 130° C. for 50 minutes to effect cross-linking. Further, it was treated with steam at 110° C. without loading any tension.

The Young's modulus as measured in a hot water at 95° C., and tenacity and elongation at breakage, of the filaments thus obtained are shown in Table 6.

TABLE 6

|  | Young's modulus (g./d.) | Tenacity (g./d.) | Elongation (percent) |
|---|---|---|---|
| The present invention | 3.0 | 1.86 | 42 |

EXAMPLE 11

The copolymers of the present invention obtained in Examples 5–10, –11 and –12, were respectively dissolved in 70% nitric acid at 0° C. to prepare a spinning solution. The resulting solutions were each extruded into 30% nitric acid aqueous solution maintained at 0° C. The resulting filaments were washed with water, stretched to 7 times the

TABLE 4

|  | Untreated | | | 160° C.×2 minutes treatment | | |
|---|---|---|---|---|---|---|
|  | Young's modulus (g./d.) | Tenacity (g./d.) | Elongation (percent) | Young's modulus (g./d.) | Tenacity (g./d.) | Elongation (percent) |
| The present invention | 2.8 | 1.52 | 73 | 2.9 | 1.52 | 70 |

EXAMPLE 9

A copolymer mixture consisting of 35% by weight of the copolymer of the present invention obtained in Example 4 and 65% by weight of a copolymer having a original length in boiling water and dried by hot air at 150° C. for 40 minutes to subject them to cross-linking. The filaments thus obtained were then subjected to a wet heat treatment in a saturated steam at 110° C. to prepare filaments of about 3 deniers.

The degree of cross-linking, Young's modulus as measured in hot water at 95° C., and tenacity and elongation at breakage, of the filaments thus obtained, are shown in Table 7.

As a control (Control 8), a copolymer consisting of 86.4% of acrylonitrile and 13.6% of

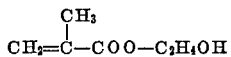

was prepared under the same conditions as in Example 2. The copolymer was spun as mentioned above to prepare filaments, which were dipped in 2.5% phosphoric acid aqueous solution, at 60° C. for 3 minutes, squeezed so as to give 1.6 times the initial dry weight thereof, dried at 80° C. so as to give a moisture of about 10%, and further treated by dry heat at 150° C. for 10 minutes to subject them to cross-linking. The degree of cross-linking, Young's modulus as measured in hot water at 95° C., and tenacity and elongation at breakage, are also shown in Table 7.

prise a linear copolymer of acrylonitrile and up to 25% total of a first comonomer and a second comonomer, said first comonomer comprising of at least 0.5% by weight of said linear copolymer and being represented by the formula of

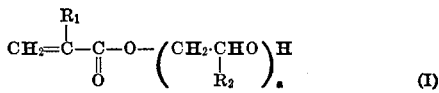 (I)

wherein each of $R_1$ and $R_2$ is independently hydrogen or methyl; and $a$ is an integer of about 1–20, and said second comonomer comprising at least 0.5% by weight of said linear copolymer represented by the formula of

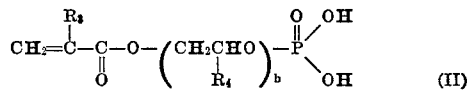 (II)

wherein $R_3$ and $R_4$ are individually hydrogen or methyl, and the salts thereof, and $b$ is an integer of 1–20.

TABLE 7

| | Cross-linking degree (percent) | Young's modulus (g./d.) | Tenacity (g./d.) | Elongation (percent) | Note |
|---|---|---|---|---|---|
| Present invention: | | | | | |
| 5–10 | 71 | 3.2 | 1.66 | 51 | |
| 5–11 | 79 | 3.3 | 1.74 | 47 | |
| 5–12 | 84 | 3.4 | 1.82 | 43 | |
| Control 8 | 64 | 1.1 | 1.61 | 54 | Discoloration to yellow and adhesion were observed in the filaments. |

What is claimed is:

1. Cross-linked acrylonitrile polymer fibers which comprise a linear copolymer of acrylonitrile, at least 0.5% by weight of a comonomer of the formula of

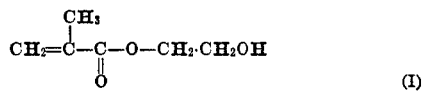 (I)

and at least 0.5% by weight of a comonomer represented by the general formula of

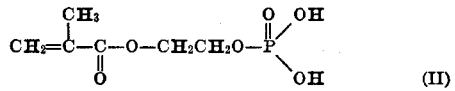 (II)

the sum total of the Compounds I and II being less than 25% by weight based upon the copolymer.

2. Cross-linked acrylonitrile polymer fibers which com-

References Cited

UNITED STATES PATENTS

| 3,264,275 | 8/1966 | Pattison et al. | 260—80.5 |
| 3,036,052 | 5/1962 | Bier | 260—85.5 |
| 3,253,880 | 5/1966 | Lawson et al. | 8—115.5 |
| 3,351,602 | 11/1967 | Dunnavant et al. | 260—29.6 |
| 2,993,033 | 7/1961 | O'Brien | 260—80.5 |
| 3,035,031 | 5/1962 | Evans | 260—85.5 |
| 2,934,555 | 4/1960 | O'Brien et al. | 260—461 |

JOSEPH L. SCHOFER, Primary Examiner

J. KIGHT, Assistant Examiner

U.S. Cl. X.R.

260—78.5 E, N, 79.3, 80 PS, 80.73, 80.75, 80.81, 85.5 R, ES, 898